United States Patent
Niu et al.

(10) Patent No.: US 6,638,585 B2
(45) Date of Patent: Oct. 28, 2003

(54) COATED MEDIA FOR IMPROVED OUTPUT TRAY STACKING PERFORMANCE

(75) Inventors: Bor-Jiunn Niu, San Diego, CA (US); Stefan Schutel, Murten (CH); Meinrad Schaer, Ependes (CH)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/057,015

(22) Filed: Jan. 25, 2002

(65) Prior Publication Data

US 2003/0142192 A1 Jul. 31, 2003

(51) Int. Cl.[7] .................................................. B41M 5/00
(52) U.S. Cl. .................................................... 428/32.22
(58) Field of Search ................................ 428/195, 325, 428/327, 331, 335, 484, 500, 513, 32.22

(56) References Cited

U.S. PATENT DOCUMENTS

| | | | | | |
|---|---|---|---|---|---|
| 5,277,965 A | * | 1/1994 | Malhotra | .................... | 428/216 |
| 5,279,885 A | * | 1/1994 | Ohmori et al. | .............. | 428/195 |
| 5,928,787 A | * | 7/1999 | Owatari et al. | .............. | 428/409 |
| 6,025,111 A | * | 2/2000 | Schell et al. | ................. | 430/212 |
| 6,177,239 B1 | * | 1/2001 | Wang et al. | ................. | 430/512 |
| 6,214,458 B1 | * | 4/2001 | Kobayashi et al. | ......... | 428/332 |
| 6,436,514 B1 | * | 8/2002 | Ishiyama et al. | ............ | 428/195 |
| 6,465,081 B2 | * | 10/2002 | Sarkar et al. | ................ | 428/195 |

* cited by examiner

*Primary Examiner*—Cynthia H. Kelly
*Assistant Examiner*—B. Shewareged

(57) ABSTRACT

The present invention is drawn to compositions and coated substrates wherein a hydrophobic backside coating layer can be implemented for use that mitigates ink transfer, surface damage, smudging, and sticking between stacked sheets in output trays of ink-jet ink printers. The backside coating can comprise hydrophobic beads suspended in a polymeric blend having a hydrophilic polymeric binder component and a hydrophobic polymeric binder component. Alternatively, the coating can comprise a hydrophobic binder blended with a natural wax. Either coating can be applied directly to the backside of a media substrate or on top of an existing hydrophilic layer that is typically applied for curl and sheet feed performance.

6 Claims, No Drawings

COATED MEDIA FOR IMPROVED OUTPUT TRAY STACKING PERFORMANCE

FIELD OF THE INVENTION

The present invention is drawn to the area of ink-jet imaging. More specifically, inkjet prints can rapidly printed and stacked in a receiving tray without substantial smearing of the printed image or ink transfer to the back of adjacent media.

BACKGROUND OF THE INVENTION

In recent years, computer printer technology has evolved to a point where very high resolution images can be transferred to various types of media, including paper. One particular type of printing involves the placement of small drops of a fluid ink onto a media surface in response to a digital signal. Typically, the fluid ink is placed or jetted onto the surface without physical contact between the printing device and the surface. Within this general technique, the specific method that the ink-jet ink is deposited onto the printing surface varies from system to system, and can include continuous ink deposit and drop-on-demand ink deposit.

With regard to continuous printing systems, inks used are typically based on solvents such as methyl ethyl ketone and ethanol. Essentially, continuous printing systems function as a stream of ink droplets are ejected and directed by a printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink-jet inks are typically based upon water and glycols. Essentially, with these systems, ink droplets are propelled from a nozzle by heat or by a pressure wave such that all of the ink droplets ejected are used to form the printed image.

There are several reasons that ink-jet printing has become a popular way of recording images on various media surfaces, particularly paper. Some of these reasons include low printer noise, capability of high speed recording, and multi-color recording. Additionally, these advantages can be obtained at a relatively low price to consumers. However, though there has been great improvement in ink-jet printing, accompanying this improvement are increased demands by consumers in this area, e.g., higher speeds, higher resolution, full color image formation, increased stability, etc. As new ink-jet inks are developed, there have been several traditional characteristics to consider when evaluating the ink in conjunction with a printing surface or substrate. Such characteristics include edge acuity and optical density of the image on the surface, dry time of the ink on the substrate, adhesion to the substrate, lack of deviation of ink droplets, presence of all dots, resistance of the ink after drying to water and other solvents, long term storage stability, and long term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

In general, ink-jet inks are either dye- or pigment-based inks. Both are typically prepared in an ink vehicle that contains the dye and/or the pigment. Dye-based ink-jet inks generally use a liquid colorant that is usually water-based to turn the media a specific color. Conversely, pigmented inks typically use a solid or dispersed colorant to achieve color.

Papers used for ink-jet printing have typically included high-quality or wood-free papers designed to have a high ink absorptivity. These papers are functionally good for ink-jet printing because the ink-jet inks may be absorbed readily and dry quickly. However, such papers often do not allow for a crisp or sharp image. Thus, in order to attain enhanced print quality and image quality as in a photograph, special media has been developed to work with aqueous inks. For example, various coating coated papers (art paper, coat paper, cast-coat paper, etc.) have been prepared by coating a layer comprising a hydrophilic binder and an inorganic pigment or particulate on a paper substrate. Additionally, recording sheets have been prepared by coating an ink absorptive layer on paper or other supports, e.g., transparent or opaque plastic film supports. An example of such specialty media utilizes a swelling-type ink absorptive layer, e.g., gelatin, polyvinyl alcohol, methyl cellulose, and the like. Though swellable media provides a relatively good substrate with respect to certain image quality properties, a drawback includes the fact that swellable media requires more dry-time than other types of media. As digital imaging becomes more popular, and inkjet output devices continue to push photo printing speeds, it has become increasingly important for inkjet prints to be able to be stacked in a printer output trays without smearing the printed image or sticking to adjacent media sheets. In other words, as a byproduct of rapid printing speeds, printed media must often be stacked before the printed image is sufficiently dry to prevent smearing or ink transfer. Though this problem is especially prevalent when using swellable media, it can be a problem with nearly all other types of media as well, depending on the ink, substrate, and print speed selected for use.

SUMMARY OF THE INVENTION

It has been recognized that ink-jet printing media can be prepared that minimizes ink transfer from the front of a printed media sheet to the back of a second media sheet when stacked in a printer output tray. It has been further recognized that such ink-jet printing media, upon printing and stacking, provides decreased gloss loss and/or surface damage of the printed image.

With this in mind, a coated substrate for ink-jet ink printing can comprise a printing surface and an opposing back surface, wherein the printing surface comprises coating formulated for accepting an aqueous ink-jet ink composition, and the back surface comprises a coating formulated for repelling the aqueous ink-jet ink composition.

Additionally, ink-jet ink printing media can comprise a paper substrate having a first side and an opposing second side; a hydrophilic polymeric material coated on the first side and the second side of the substrate; and a substantially hydrophobic polymeric composite material coated over the hydrophilic polymeric material on the second side of the substrate.

Next, a composite coating material for overcoating hydrophilic coated printing media can comprise a polymeric blend of a hydrophilic polymeric binder and a hydrophobic polymeric binder, wherein the polymeric blend has a hydrophilic polymeric binder to hydrophobic polymeric binder ratio from 1:5 to 1:1 by weight; and hydrophobic beads dispersed within the polymeric blend, wherein the polymeric blend to hydrophobic bead ratio is from 1:9 to 8:2 by weight.

Next, a coated substrate for ink-jet ink printing can comprise a printing surface and an opposing back surface, wherein the printing surface comprises a coating formulated for accepting an ink-jet ink composition, and wherein the back surface comprises a backcoating formulated for repelling the ink-jet ink composition. In this embodiment, the backcoating can comprise a hydrophobic polymeric binder blended with a natural wax, for example.

DETAILED DESCRIPTION OF THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the content clearly dictates otherwise.

"Hydrophilic polymeric binder" includes any polymeric material that has an affinity for water, or which is readily wetted or mixed with water. "Hydrophobic polymeric binder" includes any polymeric material that lacks an affinity for water, or which is not readily wetted or mixed with water.

"Polymeric blend" when referring to a blend of a hydrophilic polymeric binder and a hydrophobic polymeric binder in accordance with the present invention includes any blend that is at least 50% hydrophobic. Preferably, the blend will be a continuous blend, though this is not required.

"Hydrophobic beads" includes any polymeric particulate that can be dispersed in a polymeric blend. Such hydrophobic beads do not act as binders in accordance with embodiments of the present invention, and can provide surface roughness that improves stacking performance.

"Natural wax" includes any lipid hydrocarbon substance that exists naturally in animals, plants, minerals, and/or petroleum. For examples, such waxes can include Carnauba wax, Montan wax, and Paraffin.

"Substrate" includes any substrate that can be coated in accordance with an embodiment of the present invention, such as film base substrates, polymeric substrates, conventional paper substrates, and the like. Further, pre-coated substrates, such as polymeric coated substrates or swellable media, can also be used in embodiments of the present invention as well.

"Hydrophilic polymeric material" includes a coating for a substrate, such as a paper, that is primarily hydrophilic. Such hydrophilic polymeric material can be coated on both sides of a substrate to provide a good printing surface for ink-jet ink applications, as well as to provide balance to the back of the substrate, preventing substrate curl that may occur with a paper substrate. When a hydrophilic polymeric material is coated on a substrate, it is said to be "hydrophilic coated printed media."

A hydrophobic backside coating layer has been developed which highly mitigates smudging and sticking between stacked sheets in output trays of ink-jet ink printers. The coating can comprise a hydrophobic bead suspended in a polymeric blend having a hydrophilic polymeric binder component and a hydrophobic polymeric binder component. The coating can be applied directly to the backside of a media substrate or on top of an existing hydrophilic layer that is typically applied for reduced curl and sheet feed performance. Alternatively, a hydrophobic coating comprising a blend of a hydrophobic binder and a natural wax can be used.

In an embodiment of the present invention, a coated substrate for ink-jet ink printing can comprise a printing surface and an opposing back surface, wherein the printing surface comprises a coating formulated for accepting an ink-jet ink composition, and the back surface comprises a coating formulated for repelling said ink-jet ink composition.

The printing surface can comprise a swellable coating or other coating configured for photographic printing such as coatings comprising hydrophilic material. Further, the back surface can comprise a substantially hydrophobic coating. In one embodiment, the hydrophobic coating can be a polymeric blend of a hydrophilic polymeric binder and a hydrophobic polymeric binder, and further comprise hydrophobic beads dispersed within the polymeric blend. In this embodiment, the hydrophilic polymeric binder to hydrophobic polymeric binder ratio can be from 1:5 to 1:1 by weight, and includes a more preferred range from 1:4 to 2:3 by weight, and further includes a more preferred weight ratio of about 1:2. With respect to the polymeric blend to hydrophobic bead ratio, a range can include from 1:9 to 8:2 by weight, with a more preferred range from 1:3 to 3:2 by weight, and still a more preferred weight ratio of about 5:4. In a second embodiment, the hydrophobic coating can be a blend of a hydrophobic binder and a natural wax, preferably at a binder to wax ratio from 1:9 to 9:1 by weight.

In the former embodiment where a hydrophilic polymeric binder is part of the substantially hydrophobic coating, the hydrophilic polymeric binder for use can be selected from the group consisting of gelatin, polyvinyl alcohol, methyl cellulose, polyvinyl pyrolidone, polyethylene oxide, and combinations thereof. Additionally, within the substantially hydrophobic coating, the hydrophobic polymeric binder can be selected from the group consisting of styrene/methacrylate copolymers, acrylates, methacrylates, and combinations thereof. Further, as mentioned, as part of the substantially hydrophobic coating, hydrophobic beads can be dispersed within the polymeric blend, i.e., hydrophilic polymeric binder and hydrophobic polymeric binder. Such beads can be hydrophobic polymeric beads including those selected from the group consisting of polyethylene, polystyrene, polymethacrylate, polyacrylate, as well as glass and silica. If such beads are present, sizes ranging from 0.01 $\mu$m to 100 $\mu$m are preferred.

Alternatively, the coating on the back surface can comprise a hydrophobic polymeric binder blended with a natural wax as the backcoating. Again, the hydrophobic polymeric binder can be selected from the group consisting of styrene/methacrylate copolymers, acrylates, methacrylates and combinations thereof. In this embodiment, such a hydrophobic coating can have a hydrophobic binder to natural wax ratio from 1:9 to 9:1 by weight. It is preferred that this coating would provide an average surface roughness greater than about 80 Sheffield units, and more 10 preferably, greater than 180 Sheffield units.

In another embodiment of the present invention, ink-jet ink printing media can comprise a paper substrate having a first side and an opposing second side; a hydrophilic polymeric material coated on the first side and the second side of the substrate; and a substantially hydrophobic polymeric composite material coated over the hydrophilic polymeric material on the second side of the substrate. The hydrophilic polymeric material that is coated on the substrate can be a member selected from the group consisting of gelatin, polyvinyl alcohol, methyl cellulose, polyvinyl pyrolidone, polyethylene oxide, and combinations thereof. Additionally, the substantially hydrophobic composite material can comprise a polymeric blend of a hydrophilic polymeric binder and a hydrophobic polymeric binder having at least 50% by weight of the hydrophobic polymeric binder. Further, the substantially hydrophobic polymeric composite material can comprise further hydrophobic beads dispersed within the polymeric blend.

The hydrophilic polymeric binder present in the substantially hydrophobic polymeric composite material can be the same or a similar material used as the hydrophilic polymeric material coated on the substrate. To avoid confusion, when referring the hydrophilic polymeric material in this embodiment, what is meant is the coating material that is applied to both sides of a substrate to provide a good printing surface on a printing side, and a balance coating on the non-printing side. The reason such double sided printing is often desired, even though printing is normally carried out on a single side, is to prevent paper curl. Generally, when one coats a single side and the paper is exposed to dry and/or cold conditions, the paper has a tendency to curl. Thus, with respect to the present embodiment, the hydrophilic polymeric material is coated on both sides. Then, on the backside, the substantially hydrophobic polymeric composite material coating having a hydrophilic polymeric binder can be present as an overcoating. The presence of the hydrophilic polymeric binder acts, in part, to help bind the substantially hydrophobic polymeric coating material to the hydrophilic polymeric coating material. Thus, what is meant by substantially hydrophobic polymeric material is that the material comprises greater than 50% of a hydrophobic polymeric binder as part of the polymeric blend. This being said, the hydrophilic polymeric binder can be any functional hydrophilic binder including those selected from the group consisting of gelatin, polyvinyl alcohol, methyl cellulose, polyvinyl pyrolidone, polyethylene oxide and combinations thereof. Preferably, the hydrophilic polymeric binder is a polyvinyl alcohol. Further, the hydrophobic polymeric binder can be any functional hydrophobic polymeric binder including those selected from the group consisting of styrene/methacrylate copolymers, acrylates, methacrylates and combinations thereof. Preferably, the hydrophobic binder is a styrene/methacrylate copolymer.

In a further detailed aspect of the invention, it is preferred that the substantially hydrophobic polymeric composite material further comprise hydrophobic beads dispersed within the polymeric blend. Such hydrophobic beads can be any that are functional including those selected from the group consisting of polyethylene, polystyrene, polymethacrylate, polyacrylate, glass, silica, and combinations thereof. Preferably the hydrophobic beads comprise polyethylene.

As stated, the ink jet printing media of the present embodiment can be coated with the substantially hydrophobic polymeric composite material as described previously. Such a composite coating material for overcoating hydrophilic coated printing media can comprise a polymeric blend of a hydrophilic polymeric binder and a hydrophobic polymeric binder, wherein the polymeric blend has a hydrophilic polymeric binder to hydrophobic polymeric binder ratio from 1:5 to 1:1 by weight; and hydrophobic beads dispersed within the polymeric blend, wherein the polymeric blend to hydrophobic bead ratio is from 1:9 to 8:2 by weight. In a more detailed aspect of these embodiments, the hydrophilic polymeric binder to hydrophobic polymeric binder ratio can be from 1:4 to 2:3 by weight, preferably about 1:2 by weight. Additionally, the polymeric blend to hydrophobic bead ratio can be from 1:3 to 3:2 by weight, preferably about 5:4 by weight. Again, if such beads are present, sizes ranging from 0.01 $\mu$m to 100 $\mu$m are preferred.

In an alternative aspect of the present invention, a coated substrate for ink-jet ink printing can comprise a coated substrate having a printing surface and an opposing back surface. The printing surface can include a coating formulated for accepting an ink-jet ink composition. The back surface can include a backcoating formulated for repelling the ink-jet ink composition, such as made functional with a backcoating that comprises a hydrophobic polymeric binder blended with a natural wax. The hydrophobic polymeric binder can be selected from the group consisting of styrene/methacrylate copolymers, acrylates, methacrylates and combinations thereof, and can be present in relation to the wax at a hydrophobic binder to natural wax ratio from 1:9 to 9:1 by weight the substantially hydrophobic coating, preferably, has an average surface roughness greater than about 80 Sheffield units, though greater values can provide improved results.

In accordance with embodiments of the present invention, various coating techniques can be implemented as is desired. A coating solution can be prepared and be coated on a substrate by any suitable technique for the application of coating compositions. For example, a substrate can be coated by spray coating, dip coating, cascade coating, swirl coating, extrusion hopper coating, curtain coating, air knife coating, cast coating, and/or by using other known coating techniques. The thickness selected for each coated layer can depend upon the particular requirement or application, as would be ascertainable by one skilled in the art. Further, multi-layer coatings can be implemented, taking into account viscosity of the various coating solutions.

EXAMPLES

The following examples illustrate various formulations for preparing the coatings for ink-jet ink media substrates of the present invention. The following examples should not be considered as limitations of the invention, but should merely teach how to make known coatings and coated substrates based upon current experimental data.

Example 1

Preparation of Backcoated Paper Comprising a Hydrophilic/hydrophobic Binder

A styrene/acrylic copolymer binder (Glascol C44) was blended with a polyvinyl alcohol binder (Celvol 523) at a 7:3 ratio by weight. This coating was applied to the backside of a resin-coated photopaper from Felix Schoeller at a coat weight of 6 gram/m$^2$. The average surface roughness of the backside was measured at 6 Sheffield units using a Paper Smoothness Tester, Model 538 from Hagerty Technologies.

Example 2

Preparation of Backcoated Paper Comprising a Hydrophilic/hydrophobic Binder Having Hydrophobic Beads Dispersed therein A styrene/acrylic copolymer binder (Glascol C44) was blended with a polyvinyl alcohol binder (Celvol 523) at a 7:3 ratio by weight. To the binder blend was dispersed polyethylene beads (HA 3545) having an average particle size from about 0.1 μm to 100 μm. The ratio of total binder to beads was 5:2 by weight. This coating was applied to the backside of a resin-coated photopaper from Felix Schoeller at a coat weight of 6 gram/m². The average surface roughness of the backside was measured at 180 Sheffield units using a Paper Smoothness Tester, Model 538 from Hagerty Technologies.

Example 3

Preparation of Backcoated Paper Comprising a Hydrophilic/hydrophobic Binder Having Hydrophobic Beads Dispersed therein Polyethylene beads (HA 3545) having an average particle size from about 0.1 μm to 100 μm were dispersed in a polyvinyl alcohol binder (Celvol 523). The ratio of total binder to beads was 5:2 by weight. This coating was applied to the backside of a resin-coated photopaper from Felix Schoeller at a coat weight of 6 gram/m². The average surface roughness of the backside was measured at 180 Sheffield units using a Paper Smoothness Tester, Model 538 from Hagerty Technologies.

Example 4

Stacking Performance Comparison of Examples 1–3

Each of the coated papers of Examples 1–3 were tested for stacking performance by ranking the performance with respect to surface damage of a printed image and ink transfer from a printed side of the paper to the back side of an adjacent paper with a minimal allowance of time for drying, i.e., about 90 seconds. The image for test was printed on the front side of HP Colorfast paper. The results are provided below in Table 1 as follows:

TABLE 1

| | Stacking Performance Results* | |
|---|---|---|
| Example | Surface Damage | Ink transfer |
| 1 | 1 | 1 |
| 2 | 3 | 3 |
| 3 | 2 | 2 |

*The Stacking Performance values, i.e., surface damage and ink transfer, are based on a 1–5 scale where 5 is the best. A rank of 5 with respect to ink transfer indicates no ink transfer to the backside of the stacked paper. A rank of 5 with respect to surface damage indicates no gloss loss or other surface damage on the image layer.

As can be seen by Table 1, the combination of hydrophilic/hydrophobic binder having hydrophobic beads dispersed therein provided the best stacking surface performance results.

Example 5

Preparation of Backcoated Paper Comprising a Hydrophobic Binder/natural Wax Blend A styrene/acrylic copolymer (Glascol C44) was blended with a natural wax (Carnauba ML 156) at a 1:9 ratio by weight. This coating was applied to the backside of a resin-coated photopaper from Felix Schoeller at a coat weight of 3 gram/m². The average surface roughness of the backside was measured at 6 Sheffield units using a Paper Smoothness Tester, Model 538 from Hagerty Technologies.

Example 6

Preparation of Backcoated Paper Comprising a Hydrophobic Binder/natural Wax Blend A styrene/acrylic copolymer (Glascol C44) was blended with a natural wax (Fishcher-Tropsch ME98040M1) at a 1:9 ratio by weight. This coating was applied to the backside of a gelatin-supporting layer which was directly coated on a resin-coated photopaper from Felix Schoeller at a coat weight of 6 gram/m². The average surface roughness of the backside was measured at 37 Sheffield units using a Paper Smoothness Tester, Model 538 from Hagerty Technologies.

Example 7

Preparation of Backcoated Paper Comprising a Hydrophobic Binder/natural Wax Blend A styrene/acrylic copolymer (Glascol C44) was blended with a natural wax (Fishcher-Tropsch ME98040M1) at a 1:9 ratio by weight. This coating was applied to a resin-coated photopaper from Felix Schoeller at a coat weight of 6 gram/m². The average surface roughness of the backside was measured at 86 Sheffield units using a Paper Smoothness Tester, Model 538 from Hagerty Technologies.

Example 8

Preparation of Backcoated Paper Comprising a Hydrophobic Binder/natural Wax Blend A styrene/acrylic copolymer (Glascol C44) was blended with a natural wax (Fishcher-Tropsch ME98040M1) at a 1:9 ratio by weight. This coating was applied to a resin-coated photopaper from Felix Schoeller at a coat weight of 15 gram/m². The average surface roughness of the backside was measured at 113 Sheffield units using a Paper Smoothness Tester, Model 538 from Hagerty Technologies.

Example 9

Preparation of Backcoated Paper Comprising a Hydrophobic Binder/natural Wax Blend A styrene/acrylic copolymer (Glascol C44) was blended with a natural wax (Montan ME50228M) at a 1:9 ratio by weight. This coating was applied to a resin-coated photopaper from Felix Schoeller at a coat weight of 3 gram/m². The average surface roughness of the backside was measured at 7 Sheffield units using a Paper Smoothness Tester, Model 538 from Hagerty Technologies.

Example 10

Stacking Performance Comparison of Examples 5–9

The stacking performance exhibited by the coated media prepared according to Examples 5–9 is summarized in Table 2 below:

TABLE 2

| | Stacking Performance Results* | |
|---|---|---|
| Example | Surface Damage | Ink transfer |
| 5 | 1 | 1 |
| 6 | 1 | 2 |

TABLE 2-continued

| | Stacking Performance Results* | |
|---|---|---|
| Example | Surface Damage | Ink transfer |
| 7 | 3 | 3 |
| 8 | 3.5 | 3.5 |
| 9 | 1 | 1 |

*The Stacking Performance values, i.e., surface damage and ink transfer, are based on a 1–5 scale where 5 is the best. A rank of 5 with respect to ink transfer indicates no ink transfer to the backside of the stacked paper. A rank of 5 with respect to surface damage indicates no gloss loss or other surface damage on the image layer.

As can be seen from Table 2 above, the hydrophobic binder/natural wax hydrophobic coatings having increased surface roughness perform better with respect to both surface damage and ink transfer compared to those having less surface roughness.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A coated substrate for ink-jet ink printing, said coated substrate having a printing surface and an opposing back surface, said printing surface comprising a coating formulated for accepting an ink-jet ink composition, and said back surface comprising a substantially hydrophobic coating formulated for repelling said ink-jet ink composition, wherein the substantially hydrophobic coating comprises a polymeric blend of a hydrophilic polymeric binder and a hydrophobic polymeric binder, and further comprises hydrophobic beads dispersed within the polymeric blend.

2. A coated substrate as in claim 1 wherein the hydrophilic polymeric binder to hydrophobic polymeric binder ratio is from 1:5 to 1:1 by weight, and the polymeric blend to hydrophobic bead ratio is from 1:9 to 8:2 by weight.

3. A coated substrate as in claim 1 wherein the hydrophilic polymeric binder to hydrophobic polymeric binder ratio is from 1:4 to 2:3 by weight, and the polymeric blend to hydrophobic bead ratio is from 1:3 to 3:2 by weight.

4. A coated substrate as in claim 1 wherein the hydrophilic polymeric binder is selected from the group consisting of gelatin, modified gelatin, polyvinyl alcohol, modified polyvinyl alcohol, methyl cellulose, polyvinyl pyrolidone, polyethylene oxide, polyvinyl acetal, modified polyvinyl acetal and combinations thereof, and wherein the hydrophobic polymeric binder is selected from the group consisting of styrene/methacrylate copolymers, acrylates, methacrylates, and combinations thereof, and wherein the hydrophobic beads are selected from the group consisting of polyethylene, polystyrene, polymethacrylate, polyacrylate, polypropylene, glass, silica, and combinations thereof.

5. A coated substrate as in claim 1 wherein the hydrophobic beads are from 0.01 $\mu$m to 100 $\mu$m in size, providing an average surface roughness greater than about 80 Sheffield units.

6. A coated substrate as in claim 1 wherein the printing surface comprises a swellable or polymeric coating.

* * * * *